US009660895B1

(12) United States Patent
Bennett

(10) Patent No.: US 9,660,895 B1
(45) Date of Patent: May 23, 2017

(54) GEOLOCATION ROUTING AND SIMULATION OF NETWORK CONDITIONS

(71) Applicant: Amazon Technologies, Inc., Reno, NV (US)

(72) Inventor: Brian Matthew Bennett, Aliso Viejo, CA (US)

(73) Assignee: Amazon Technologies, Inc., Reno, NV (US)

( * ) Notice: Subject to any disclaimer, the term of this patent is extended or adjusted under 35 U.S.C. 154(b) by 581 days.

(21) Appl. No.: 14/196,734

(22) Filed: Mar. 4, 2014

(51) Int. Cl.
G06F 15/173 (2006.01)
H04L 12/26 (2006.01)
H04L 29/06 (2006.01)
H04L 29/08 (2006.01)

(52) U.S. Cl.
CPC ........ *H04L 43/50* (2013.01); *H04L 29/06884* (2013.01); *H04L 29/08144* (2013.01); *H04L 63/1408* (2013.01)

(58) Field of Classification Search
CPC .............. H04L 43/50; H04L 29/06884; H04L 29/08144; H04L 63/1408; H04L 43/00
See application file for complete search history.

(56) References Cited

U.S. PATENT DOCUMENTS

| 6,104,716 A | 8/2000 | Crichton et al. |
| 6,671,729 B1 | 12/2003 | Gordon et al. |
| 7,330,430 B2 | 2/2008 | Lodha |
| 7,403,978 B2 * | 7/2008 | Parekh .............. G06F 17/30241 707/E17.018 |
| 7,830,813 B1 * | 11/2010 | Lo .......................... G01R 31/08 370/235 |
| 7,895,353 B2 | 2/2011 | Jansson |
| 8,385,199 B1 | 2/2013 | Coward et al. |
| 8,463,942 B2 * | 6/2013 | Parekh .............. G06F 17/30241 709/218 |
| 8,631,158 B1 * | 1/2014 | Michaelis .............. G06Q 30/02 455/414.1 |
| 2008/0244076 A1 * | 10/2008 | Shah ....................... H04W 4/02 709/227 |
| 2009/0217351 A1 | 8/2009 | Burch et al. |
| 2013/0275547 A1 * | 10/2013 | Chew ...................... H04L 67/20 709/217 |

(Continued)

OTHER PUBLICATIONS

Buyukkokten et al., "Exploiting Geographical Location Information of Web Pages", Department of Computer Science, Stanford University, Stanford, CA 94305; pp. 1-6.*

(Continued)

*Primary Examiner* — Krisna Lim
(74) *Attorney, Agent, or Firm* — Robert C. Kowert; Meyertons, Hood, Kivlin, Kowert & Goetzel, P.C.

(57) ABSTRACT

Methods and systems for geolocation routing and simulation of network conditions are disclosed. A network traffic profile is determined for a client device. A network access server selects an endpoint server based on the location of the selected endpoint server. The network access server routes traffic from the client device to an external server through the selected endpoint server. The network traffic from the client device to the external server appears to originate from a network address of the selected endpoint server. Network conditions for the network traffic are simulated based on the network traffic profile.

20 Claims, 7 Drawing Sheets

(56) References Cited

U.S. PATENT DOCUMENTS

2013/0343387 A1* 12/2013 Stroud .................. H04L 45/74
370/392

OTHER PUBLICATIONS

Stephen E. Lamm et al., "Real-time geographic visualization of World Wide Web Traffic", Computer Networks and ISDN Systems 28 (1996), pp. 1457-1468.*
"Linux Advanced Routing & Traffic Control HowTo", Bert Hubert, May 2012, pp. 1-160.

* cited by examiner

GEOLOCATION ROUTING AND SIMULATION OF NETWORK CONDITIONS

BACKGROUND

Many companies and other organizations operate computer networks that interconnect numerous computing systems to support their operations, such as with the computing systems being co-located or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. As the scale and scope of typical data centers has increased, the tasks of provisioning, administering, and managing the computing resources have become increasingly complicated.

Examples of such large-scale systems include online merchants and marketplaces, internet service providers, online businesses such as photo processing services, corporate networks, cloud computing services, web-based hosting services, etc. These entities may maintain computing resources in the form of large numbers of computing devices (e.g., thousands of hosts) that are hosted in geographically diverse locations. Clients of such systems may also be located in geographically diverse locations. Additionally, clients may connect to such systems using communications media and networks with varying characteristics and conditions. Variations in network characteristics and network conditions may result in different experiences for clients.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for performing geolocation routing and simulation of network conditions are described. Using the methods and systems as described herein, network connections may be simulated for clients in varying geographical locations. Tunneling may be used to perform geolocation routing to endpoint servers in various geographical locations so that outgoing network traffic may appear to originate from those locations. Additionally, traffic shaping may be performed to simulate different network conditions (e.g., degraded conditions). In this manner, customer service technicians for an online organization (e.g., an online merchant) may simulate the experiences of customers in various locations.

Figure 1:
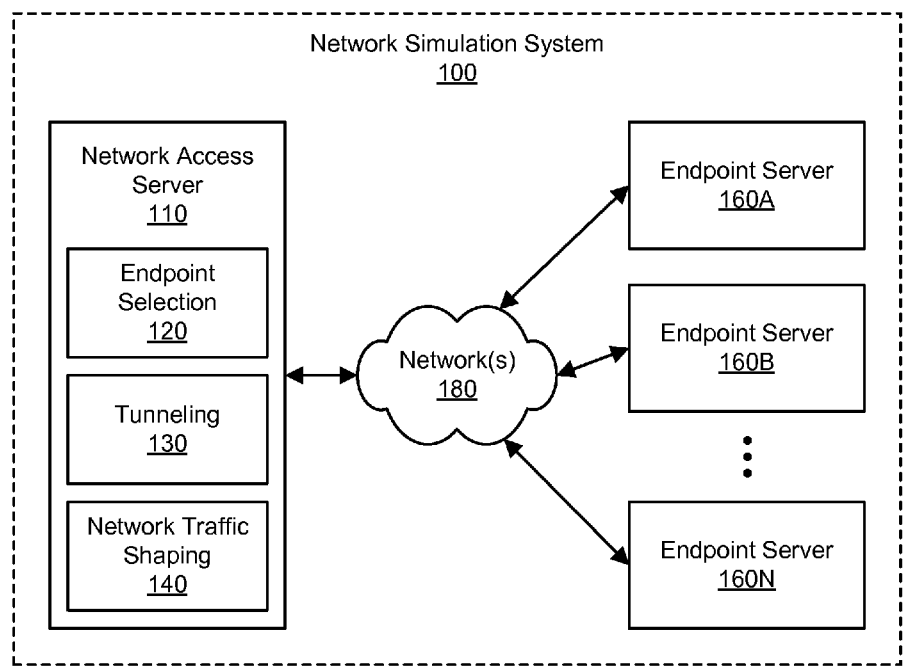
FIG. 1 illustrates an example system environment for geolocation routing and simulation of network conditions, according to one embodiment.

FIG. 1 illustrates an example system environment for geolocation routing and simulation of network conditions, according to one embodiment. The example system environment may implement a network simulation system 100. The network simulation system 100 may include at least one network access server 110 and a plurality of endpoint servers such as endpoint servers 160A and 160B through 160N. Although three endpoint servers 160A, 160B, and 160N are illustrated for purposes of example, it is contemplated that any suitable number and configuration of endpoint servers may be used with the network simulation system 100. The network simulation system 100 may use one or more networks 180 and interconnections to couple the various components. Elements of the network simulation system 100 may be located in any suitable location relative to one another, from being virtual compute instances hosted on the same computing hardware to being different physical compute instances hosted in the same data center to being geographically remote. For example, the endpoint servers 160A, 160B, and 160N may be physically located in different geographical zones relative to one another. However, the network access server 110 may be located in the same geographical zone as one of the endpoint servers 160A-160N or in a different geographical zone. In one embodiment, at least some of the endpoint servers 160A-160N may be owned and/or operated by the same entity that operates the network access server 110. In one embodiment, at least some of the endpoint servers 160A-160N may not be owned by the same entity that operates the network access server 110, and access to those endpoint servers may be obtained by lease or other arrangement.

In various embodiments, the network access server 110 may provide network access by connecting to one or more of the endpoint servers 160A-160N over the network(s) 180. The network access server 110 may include a plurality of components that are configured to perform aspects of providing network access. For example, the network access server 110 may include endpoint selection functionality 120, tunneling functionality 130, and network traffic shaping functionality 140. The network access server 110 may comprise one or more computing devices, any of which may be implemented by the example computing device 3000 illustrated in FIG. 7. In various embodiments, the functionality of the different services, components, and/or modules of the network access server 110 (e.g., endpoint selection functionality 120, tunneling functionality 130, and network traffic shaping functionality 140) may be provided by the same computing device or by different computing devices. If any of the various components are implemented using different computing devices, then the respective computing devices may be communicatively coupled, e.g., via a network. Each of the endpoint selection functionality 120, tunneling functionality 130, and network traffic shaping functionality 140 may represent any combination of software and hardware usable to perform their respective functions, as discussed as follows.

In one embodiment, the endpoint selection functionality 120 may select ones of the endpoint servers 160A-160N for use in providing network access. An endpoint server may be selected based on any suitable combination of characteristics. In one embodiment, an endpoint server may be selected based on its geographical location. In this manner, the network simulation system 100 may provide network access at endpoints in various geographical locations in order to simulate a physical presence in those geographical locations. In one embodiment, an endpoint server may also be selected based on its hardware and/or software configuration, its performance metrics, its usage costs, etc.

In one embodiment, the tunneling functionality 130 may implement secure tunneling with one or more of the endpoint servers 160A-160N (e.g., ones of the endpoint servers selected using the endpoint selection functionality 120). In one embodiment, the tunneling functionality 130 may use any suitable authentication and encryption techniques to ensure the security of data transmitted over a secure tunnel between the network access server 110 and one of the endpoint servers 160A-160N. The tunnel may be established using a point-to-point connection over one or more public and/or private network(s) 180 and/or interconnections. In one embodiment, the tunnel established between the network access server 110 and one of the endpoint servers 160A-160N may be implemented as a secure tunnel or virtual private network (VPN) tunnel.

In one embodiment, the network traffic shaping functionality 140 may simulate different network characteristics and/or conditions. For example, the network traffic shaping functionality 140 may simulate network characteristics such as latency, bandwidth caps, and packet loss. The various characteristics may be simulated for network access provided through one or more of the endpoint servers 160A-160N. In one embodiment, the network traffic shaping functionality 140 may use a traffic shaping component of an operating system on the network access server 110 to modify characteristics of incoming and outgoing network traffic. Using the endpoint selection functionality 120, tunneling functionality 130, and network traffic shaping functionality 140, the network access server 110 may provide secure network access having simulated network conditions to an endpoint server in a particular geographical location.

Figure 7:
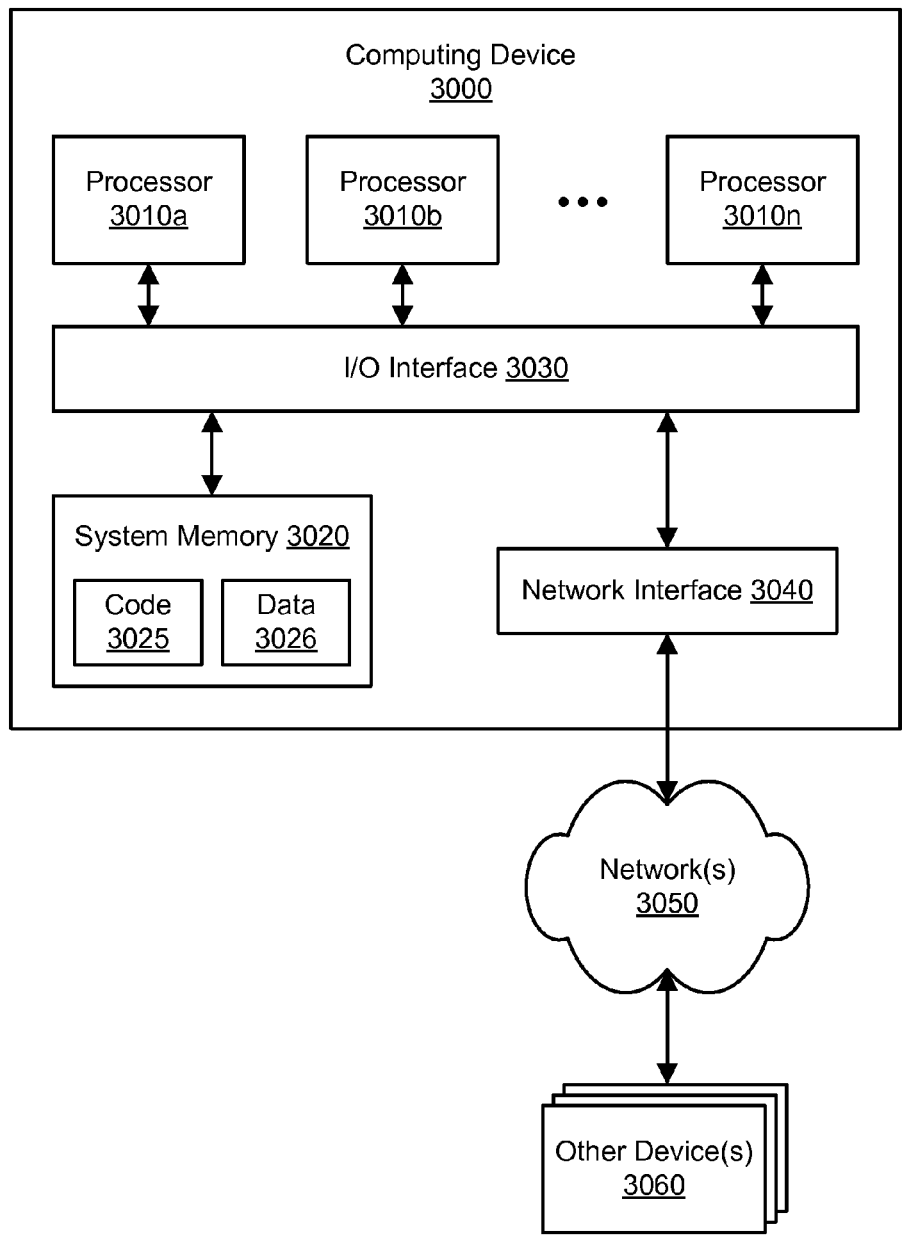
FIG. 7 illustrates an example of a computing device that may be used in some embodiments.

Each of the endpoint servers 160A-160N may comprise one or more computing devices, any of which may be implemented by the example computing device 3000 illustrated in FIG. 7. In various embodiments, portions of the functionality of the network simulation system 100, including the network access server 110 and the endpoint servers 160A-160N, may be provided by the same computing device or by any suitable number of different computing devices. In some embodiments, the network access server 110 and/or endpoint servers 160A-160N may be implemented as virtual compute instances or as physical compute instances. The virtual compute instances and/or physical compute instances may be provisioned and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 7.

In one embodiment, a suitable component of the network simulation system 100 may select and/or provision the endpoint servers 160A-160N. For example, the endpoint servers 160A-160N may be provisioned from a suitable pool of available computing instances. In one embodiment, additional computing instances may be added to the endpoint servers 160A-160N as needed. In one embodiment, computing instances may be returned to the pool of available computing instances from the endpoint servers 160A-160N if the computing instances are not needed at a particular point in time.

In one embodiment, the functionality of aspects of the network simulation system 100, including the network access server 110 and/or endpoint servers 160A-160N, may be provided to clients using a provider network. For example, the functionality of the network simulation system 100 may be presented to clients as a web-accessible service. A network set up by an entity such as a business or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A number of different types of computing devices may be used singly or in combination to implement the resources of the provider network in different embodiments, including general purpose or special purpose computer servers, storage devices, network devices, and the like.

In one embodiment, a provider network may implement a flexible set of resource reservation, control, and access interfaces for clients. For example, a provider network may implement a programmatic resource reservation interface (e.g., via a web site or a set of web pages) that allows clients to learn about, select, purchase access to, and/or reserve resources. In one embodiment, the endpoint servers 160A-160N may be reserved by the network access server 110 or any other suitable component using such an interface. In one embodiment, the network access server 110 may use one or more suitable interfaces (such as one or more web pages, an application programming interface [API], or a command-line interface [CLI]) to reserve and configure the endpoint servers 160A-160N.

Figure 2:
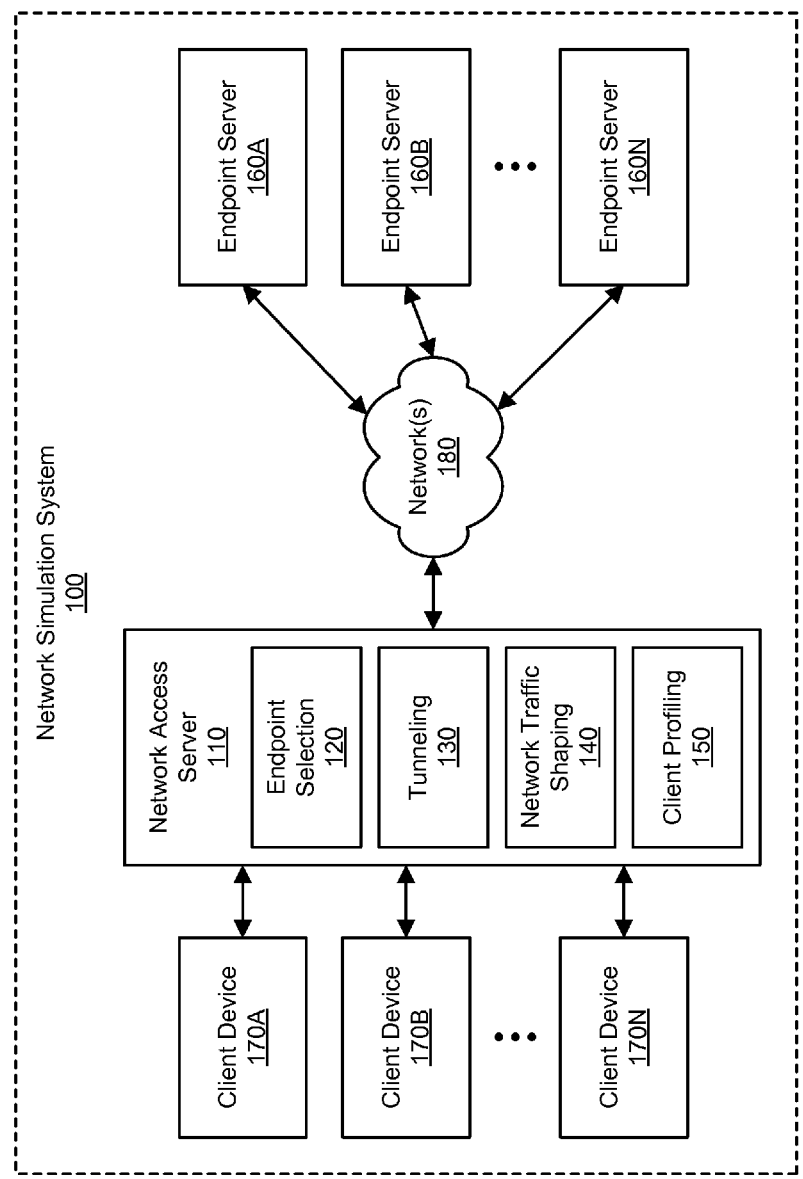
FIG. 2 illustrates an example system environment for geolocation routing and simulation of network conditions for client devices, according to one embodiment.

FIG. 2 illustrates an example system environment for geolocation routing and simulation of network conditions for client devices, according to one embodiment. As discussed above, the network access server 110 may provide secure network access having simulated network conditions to an endpoint server in a particular geographical location. In one embodiment, the network access server 110 may provide such network access to one or more clients such as client devices 170A and 170B through 170N. Although three client devices 170A, 170B, and 170N are illustrated for purposes of example, it is contemplated that any suitable number of client devices may be used in conjunction with the network simulation system 100. In one embodiment, any of the client devices 170A-170N may be implemented by the example computing device 3000 illustrated in FIG. 7. The client devices 170A-170N may typically represent mobile devices, including smartphones, tablets, etc.

In various embodiments, the network access server 110 may provide wired and/or wireless access to the client devices 170A-170N. In one embodiment, for example, the network access server 110 may implement or include a wireless access point to allow the client devices 170A-170N to connect to the wired network(s) over a wireless connection. Accordingly, the network access server 110 may manage a local wireless network which the client devices 170A-170N may discover and join. In one embodiment, the network access server 110 may provide network access to the endpoint servers 160A-160N to client devices 170A-170N that are geographically remote from the network access server 110 but connected to the network access server 110 over one or more public or private networks.

In one embodiment, the network access server 110 may comprise a client profiling functionality 150. The client profiling functionality 150 may generate and/or maintain different network traffic shaping profiles for the client devices 170A-170N. Each network traffic shaping profile (also referred to herein as a "network traffic profile," a "traffic shaping profile," or a "profile") may describe network conditions that are sought to be simulated using the network traffic shaping functionality 140. Using the traffic shaping profiles, different network conditions may be simulated for different client devices. In one embodiment, different network conditions may be simulated for different client devices in a simultaneous or concurrent manner. The client profiling functionality 150 may also maintain a geolocation selection for each of the client devices 170A-170N, and the geolocation selection may be used to select one of the endpoint servers 160A-160N for a particular client. In one embodiment, the client profiling functionality 150 may generate and/or maintain a different profile for each of the client devices 170A-170N that obtain network access through the network access server 110. In one embodiment, two or more of the client devices 170A-170N may share a traffic shaping profile, e.g., if the same or similar network conditions and the same geolocation are sought to be simulated for the client devices that share the profile. Using the client profiling functionality 150 and the tunneling functionality 130, the network access server 110 may provide network access for multiple clients at any given time, where each client has its own individual tunnel and traffic shaping profile. Further aspects of traffic shaping profiles are discussed below with reference to FIG. 5.

Figure 3:
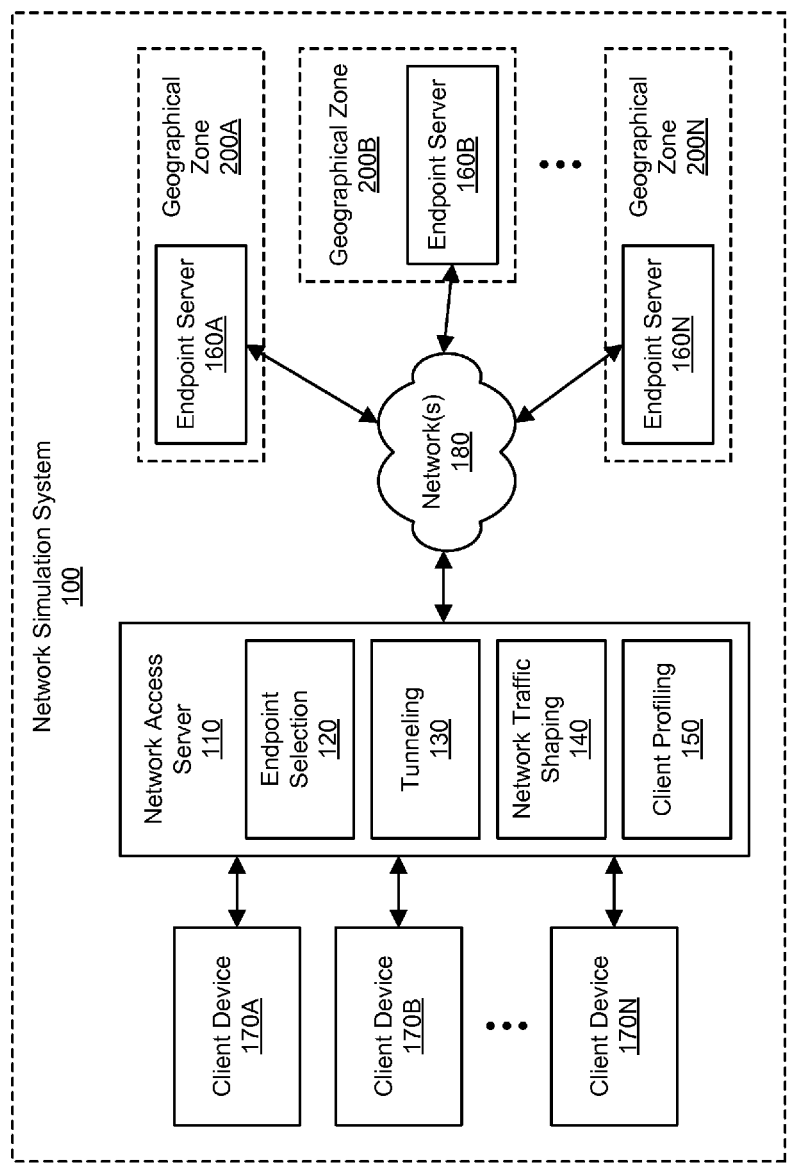
FIG. 3 illustrates an example system environment for geolocation routing and simulation of network conditions with geographical zones, according to one embodiment.

FIG. 3 illustrates an example system environment for geolocation routing and simulation of network conditions with geographical zones, according to one embodiment. As discussed above, the network simulation system 100 may provide network access at endpoint servers 160A-160N in various geographical locations in order to simulate a physical presence in those geographical locations. Accordingly, individual endpoint servers 160A, 160B, and 160N may be physically located in different geographical zones relative to one another. As shown in the example of FIG. 3, the endpoint server 160A may be located in one geographical zone 200A, the endpoint server 160B may be located in another geographical zone 200B, and the endpoint server 160N may be located in yet another geographical zone 200N. Although three geographical zones 200A, 200B, and 200N are illustrated for purposes of example, it is contemplated that any suitable number and configuration of geographical zones may be used with the network simulation system 100.

The geographical zones 200A-200N may reflect physical areas of any suitable size, including hemispheres, time zones, continents, nations, states, districts, or other areas defined by political or geographical boundaries. In one embodiment, the geographical zones 200A-200N may reflect business boundaries, such as geographical zones served by different marketplaces offered by an online merchant. In one embodiment, two or more of the geographical zones 200A-200N may overlap at least partially. In one embodiment, any of the geographical zones 200A-200N may include locations that are not contiguous. In one embodiment, at least some of the geographical zones 200A-200N may represent the locations of endpoint servers 160A-160N that are owned and/or operated by the same entity that operates the network access server 110. In one embodiment, at least some of the geographical zones 200A-200N may represent the locations of endpoint servers 160A-160N that are leased and not owned by the same entity that operates the network access server 110.

Figure 4:
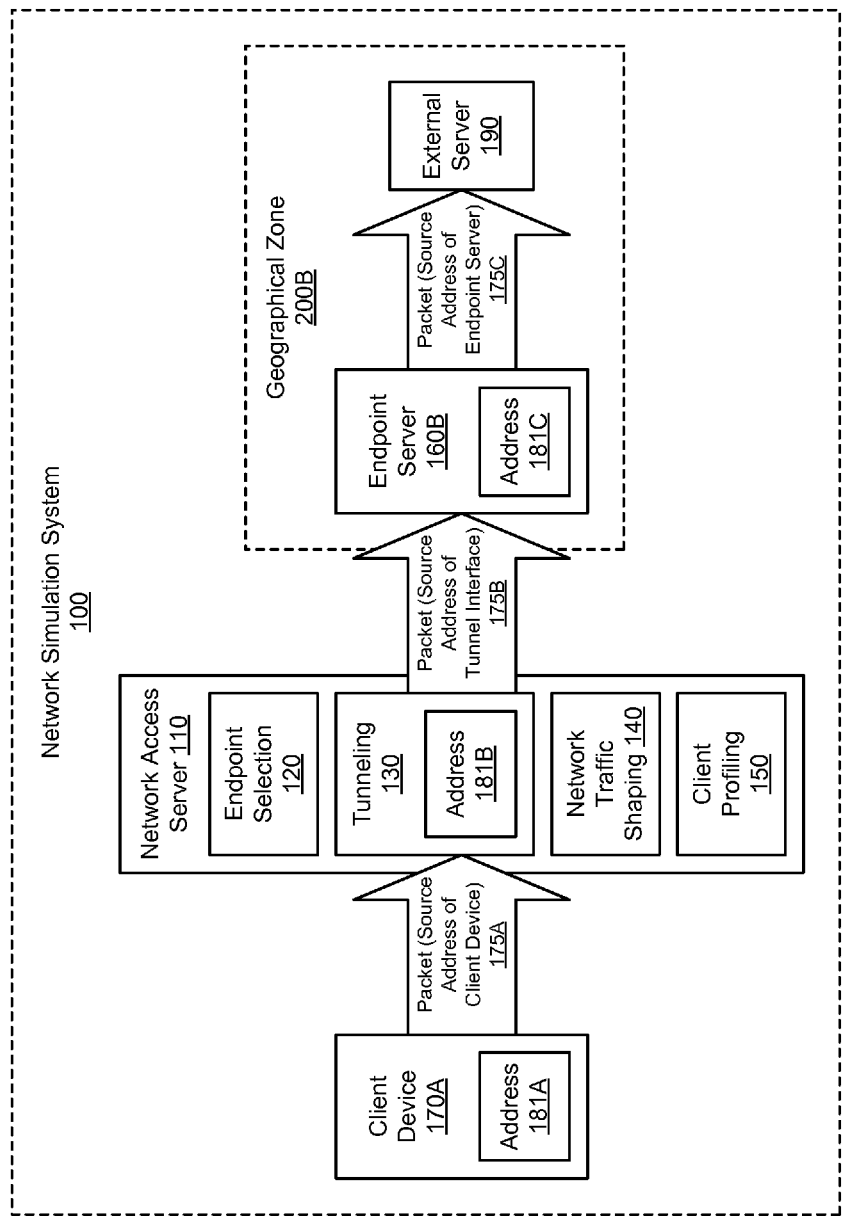
FIG. 4 illustrates an example system environment for geolocation routing and simulation of network conditions with network address translation for packets, according to one embodiment.

FIG. 4 illustrates an example system environment for geolocation routing and simulation of network conditions with network address translation for packets, according to one embodiment. Using the functionality of the network access server 110 as described above, network traffic originating from a client device may appear to an external server to originate from the selected endpoint server. A client device 170A may specify a traffic shaping profile and a desired geolocation to the network access server 110. Based on the geolocation specified by the client device 170A, a particular endpoint server 160B may be selected to provide network access for the particular client device 170A. In one embodiment, the particular endpoint server 160B may be selected for geolocation routing for each individual packet that is received by the network access server 110 from the client device 170A. The client device 170A may have one network address (e.g., IP address) 181A, the tunnel interface provided by the tunneling functionality 130 may have another network address (e.g., IP address) 181B, and the selected endpoint server 160B may have yet another network address (e.g., IP address) 181C. To use the network access provided by the network access server 110, the client device 170A may generate network packets which are sent to the endpoint server 160B through the tunnel.

The client device 170A may seek to communicate with an external server 190, and the external server 190 may be located in a particular geographical zone 200B. In one embodiment, the external server 190 may implement a geolocation restriction such that it will acknowledge or conduct particular types of transactions only with clients within the same geographical zone 200B (and possibly one or more additional zones). For example, the external server 190 may represent an online merchant, online marketplace, or other entity that provides data to or conducts transactions with clients only in particular locales. In one embodiment, the external server 190 may be determined based on the desired geolocation specified by the client device 170A. For example, the external server 190 may represent an online marketplace that serves clients in the specified geographical zone 200B, and the external server 190 may be selected from a set of external servers that represent online marketplaces for a variety of geographical zones. Accordingly, the network simulation system 100 may perform the following operations to allow the client device 170A to communicate with the external server 190.

In one embodiment, the client device 170A may send to the network access server 110 a packet 175A having a source address of the client device's address 181A and a destination address (e.g., a web address or IP address) of the external server 190. In one embodiment, the traffic shaping profile and/or the desired geographical zone 200B may be specified by the client device 170A using any suitable interface. Using the traffic shaping profile associated with the client device 170A, the packet 175A may be processed by the network traffic shaping functionality 140, e.g., to modify the latency and/or packet loss of the traffic and/or to respect a bandwidth cap, etc. The endpoint server 160B may be selected for the packet 175A based on the desired geographical zone 200B as well as any other desired characteristics. When the packet is ready to be transmitted over the network(s) 180 to the endpoint server 160B, the network access server 110 may determine which routing table to use for the packet. In one embodiment, each routing table has a one-to-one relationship with a tunnel interface. The packet may be processed using network address translation (NAT) so that the source address is changed from the address 181A of the client device 170A to the external address 181B of the tunnel interface. In one embodiment, the source port of the packet may be changed to a random port. The mapping for the modified address and the modified source port may be stored in a table so that packets received from the endpoint server 160B may be correctly routed back to the client device 170A. The modified packet 175B, now having a source address 181B of the tunnel interface, may be encapsulated, encrypted, and sent to the endpoint server 160B through the tunnel.

The endpoint server 160B may receive the packet 175B, de-encapsulate it, and inspect the inner packet. The inner packet may include the source address 181B and the destination address of the external server 190. Using network address translation on the endpoint server 160B, the source address of the packet may be changed to the address 181C of the endpoint server 160B, and the source port may again be randomized. The mapping for the newly modified address and newly modified source port may be stored in a table for the routing of packets back to the client device 170A. The further modified packet 175C may be sent to the external server 190. The further modified packet 175C may be sent over one or more public networks (e.g., the internet), and the further modified packet 175C may not be encapsulated or encrypted. The external server 190 may respond to the packet, and the response may be sent back to the client device 170A using the tunnel between the endpoint server 160B and the network access server 110. Packets sent back to the client device 170A may be processed by the network traffic shaping functionality 140 using the traffic shaping profile associated with the client device 170A, e.g., to modify the latency and/or packet loss of the traffic and/or to respect a bandwidth cap, etc.

In this manner, the experience of a client with an online marketplace (or other suitable server) may be simulated by a user outside the geographical scope of the marketplace. The user may represent a customer service technician or other employee associated with the online marketplace. The client device may run a test suite to gather performance metrics under the simulated network conditions. The network access server 110 may maintain different traffic shaping settings for individual client devices 170A-170N. By simulating various network conditions for customers in various geographical areas, the customer experience on the online marketplace may be tested under the various network conditions and/or from the various geographical locations. Accordingly, the network simulation system 100 may eliminate the need to maintain whitelists of IP addresses that bypass geolocation restrictions for access to the external server 190.

Figure 5:
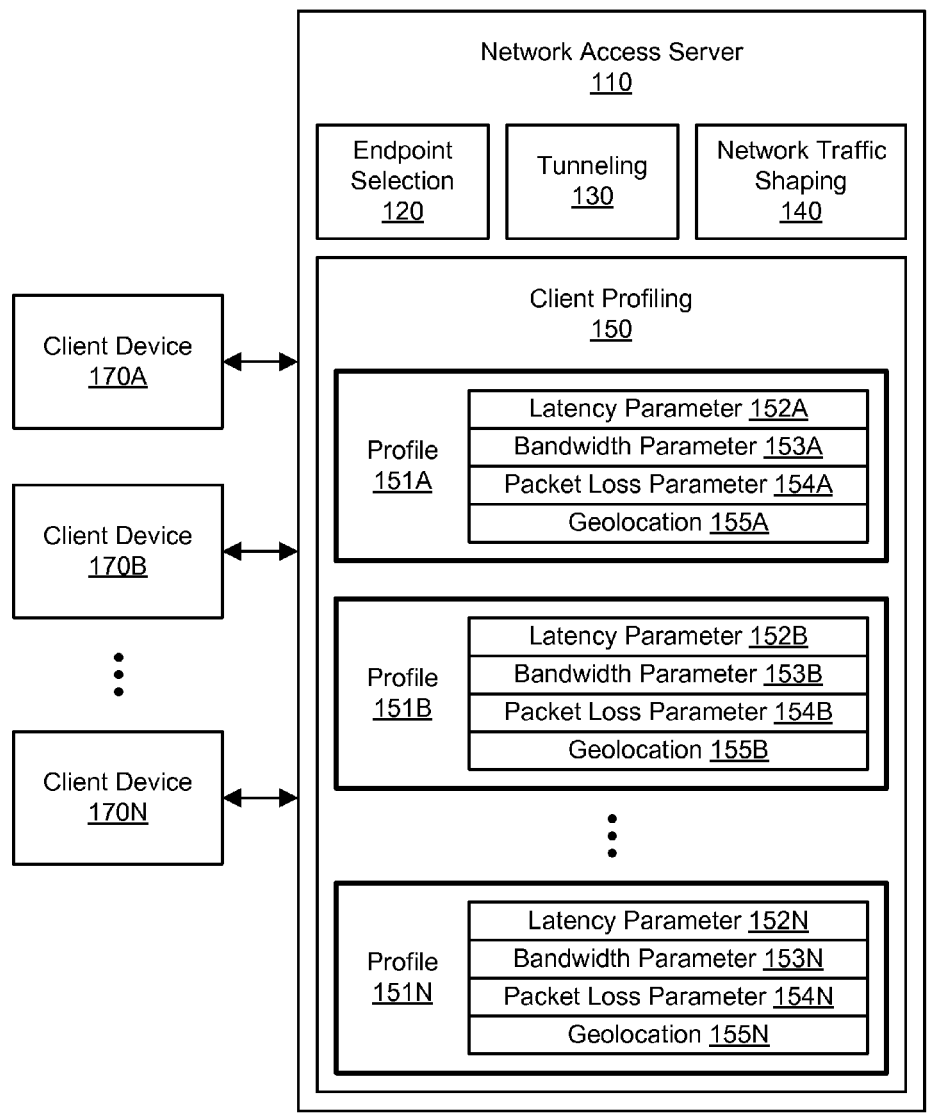
FIG. 5 illustrates network traffic profiles for simulation of network conditions, according to one embodiment.

FIG. 5 illustrates network traffic profiles for simulation of network conditions, according to one embodiment. As discussed above, the client profiling functionality 150 may generate and/or maintain different network traffic shaping profiles for the client devices 170A-170N. Each profile may describe network conditions that are sought to be simulated using the network traffic shaping functionality 140. In one embodiment, each profile may also describe a geolocation that is sought to be simulated. Using the traffic shaping profiles, different network conditions (e.g., degraded conditions) in various locations may be simulated for different client devices. Accordingly, the client profiling functionality 150 may maintain various traffic shaping profiles such as profiles 151A and 151B through 151N. Although three traffic shaping profiles 151A, 151B, and 151N are illustrated for purposes of example, it is contemplated that any suitable number of client devices may be used in conjunction with the network simulation system 100. The profiles 151A-151N may not have a one-to-one relationship with the client devices 170A-170N. For example, the client profiling functionality 150 may maintain more profiles 151A-151N than there are client devices 170A-170N. As another example, two or more of the client devices 170A-170N may share one of the profiles 151A-151N.

In one embodiment, one of the client devices 170A-170N may specify the parameters associated with a profile using a suitable interface provided by the network access server 110, and the client profiling functionality 150 may generate and maintain a profile with the specified parameters. The interface(s) may include an application programming interface (API) and/or a user-friendly, web-based interface. In one embodiment, one of the client devices 170A-170N may select from a set of predefined traffic shaping profiles using a suitable interface provided by the network access server 110. The predefined traffic shaping profiles may represent particular types of networks and/or particular network conditions. For example, the client profiling functionality 150 may provide predefined profiles for simulating 3G wireless networks, 4G wireless networks, Edge wireless networks, LTE wireless networks, WiFi networks, satellite-based networks, etc. Additionally, the predefined profiles may include profiles for particular types of network conditions, such as a "3G poor" profile to simulate a low-quality or degraded 3G network.

Each of the traffic shaping profiles 151A-151N may include one or more parameters describing network conditions to be simulated. In one embodiment, each profile may include a latency parameter (e.g., latency parameters 152A-152N) to indicate a latency metric to be simulated, a bandwidth parameter (e.g., bandwidth parameters 153A-153N) to indicate a bandwidth cap to be simulated, and a packet loss parameter (e.g., packet loss parameters 154A-154N) to indicate a packet loss metric to be simulated. For example, a profile for simulating a satellite-based network may indicate a 5 ms latency, a 1 megabit bandwidth cap, and a 5% packet loss. As another example, a profile for simulating an LTE network may indicate a 100 ms latency, a 14 megabit bandwidth cap, and a 0% packet loss. In one embodiment, each of the profiles 151A-151N may include a desired geolocation (e.g., geolocations 155A-155N) to be simulated for one or more of the client devices 170A-170N. In this manner, different networks or connection types may be simulated by maintaining different profiles for shaping or conditioning network traffic between a client device and a selected endpoint server.

In one embodiment, a client device may change its associated traffic shaping profile at any time and "on the fly." In other words, a client device may request that a second set of packets be conditioned according to a second set of traffic shaping parameters after a first set of packets has already been conditioned according to a first set of traffic shaping parameters. Changing the traffic shaping profile for a client device may include changing the requested geolocation or maintaining the same geolocation.

Figure 6:
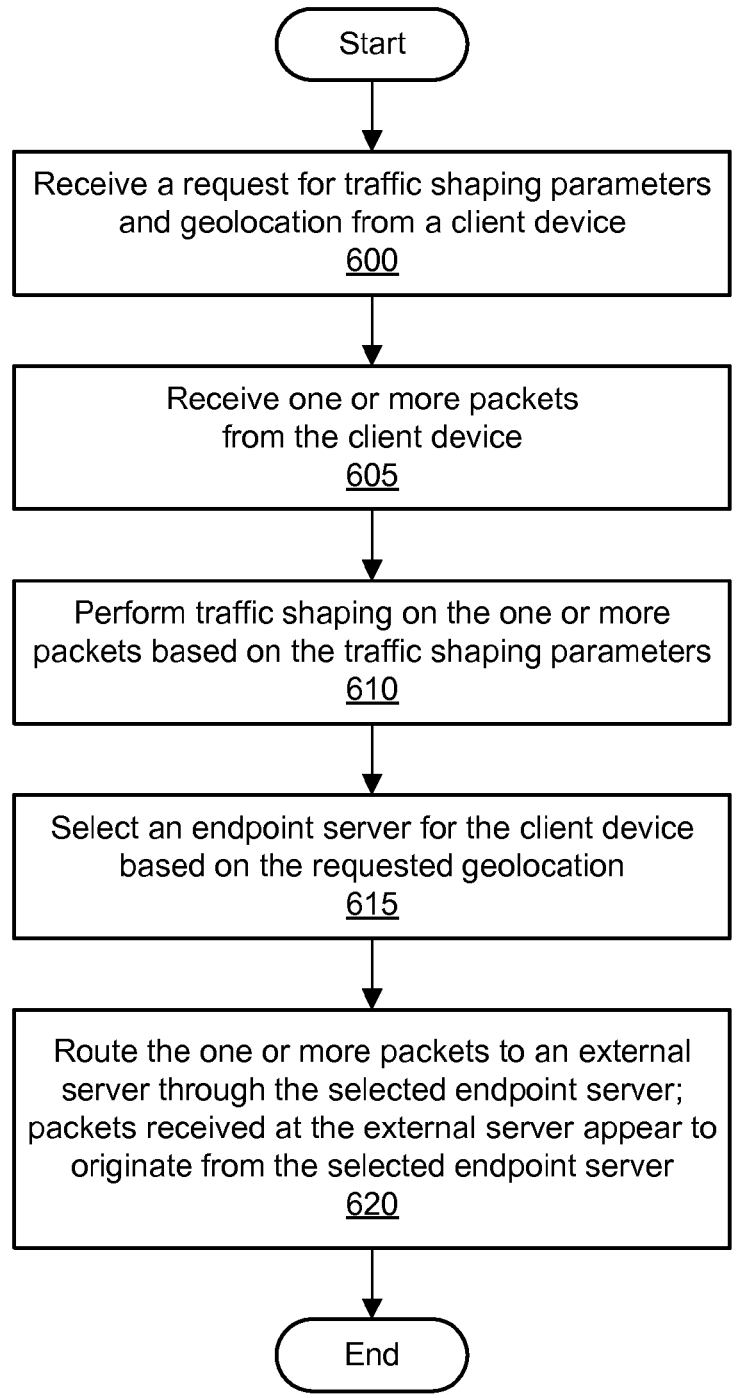
FIG. 6 is a flowchart illustrating a method for performing geolocation routing and simulation of network conditions, according to one embodiment.

FIG. 6 is a flowchart illustrating a method for performing geolocation routing and simulation of network conditions, according to one embodiment. As shown in 600, a request for traffic shaping parameters and a geolocation may be received by a network access server from a client device. A network traffic profile may be specified by the client device or determined for the client device based on traffic shaping parameters specified in the request. The profile may describe network conditions and a geolocation to simulate. For example, the profile may indicate a latency for network traffic, a packet loss for network traffic, a bandwidth cap for network traffic, and/or a desired geolocation. In one embodiment, the profile may represent typical conditions for a particular network or connection type, such as 3G, 4G, Edge, LTE, WiFi, satellite, etc. The profile may be determined by the client device specifying the profile by name (e.g., the name of the network to be simulated), by the client device supplying the specific conditions to be simulated (e.g., latency, bandwidth, and/or packet loss parameters), or by any other suitable technique.

As shown in 605, one or more packets may be received at the network access server from the client device. As shown in 610, traffic shaping may be performed on the one or more packets based on the traffic shaping parameters in the network traffic profile associated with the client. In one embodiment, performing the traffic shaping may include modifying latency characteristics for the one or more packets, enforcing a bandwidth cap, and/or dropping one or more packets based on a packet loss parameter.

As shown in 615, an endpoint server may be selected to provide network access for the client device. The endpoint server may be selected by the network access server from a pool of available endpoint servers based on the geolocation requested by the client device and the geographical location of the selected endpoint server. For example, the endpoint server may be selected because it is physically located within a particular geographical zone specified by the client device.

As shown in 620, network traffic (e.g., the one or more packets) may be routed from the client device to an external server through the selected endpoint server. As discussed above with respect to 610, the network traffic may be routed using simulated conditions based on the network traffic profile, e.g., to modify the latency and/or packet loss of the traffic and/or to respect a bandwidth cap. A tunnel (e.g., a VPN tunnel or other secure tunnel) may be used to send the network traffic from the network access server to the selected endpoint server. Using tunneling and network address translation, the traffic received at the external server may appear to originate from the selected endpoint server rather than from the client device or network access server. In this manner, a geolocation restriction enforced by the external server may be bypassed.

Illustrative Computer System

In at least some embodiments, a computer system that implements a portion or all of one or more of the technologies described herein may include a general-purpose computer system that includes or is configured to access one or more computer-readable media. FIG. 7 illustrates such a general-purpose computing device 3000. In the illustrated embodiment, computing device 3000 includes one or more processors 3010a-3010n coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010a and 3010b through 3010n (e.g., two, four, eight, or another suitable number), referred to collectively as processors 3010. Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of computing devices, each comprising at least one processor coupled to a respective memory, wherein the plurality of computing devices are configured to implement a network simulation system comprising a network access server and a plurality of endpoint servers, and wherein the network access server is configured to:
  determine a network traffic profile for a client device seeking network access through the network access server, wherein the network traffic profile comprises one or more of a network latency parameter, a network bandwidth parameter, or a network packet loss parameter;
  select an individual endpoint server from the plurality of endpoint servers based on a geographical location of the selected endpoint server;
  route network traffic from the client device to an external server through the selected endpoint server, wherein the network traffic sent from the client device to the external server appears to originate from a network address of the selected endpoint server; and
  simulate network conditions for the network traffic based on the network traffic profile.

2. The system as recited in claim 1, wherein the network access server is configured to:
  create a tunnel between the network access server and the selected endpoint server, wherein the network traffic from the client device to the external server is routed through the tunnel using network address translation.

3. The system as recited in claim 1, wherein, in simulating the network conditions for the network traffic based on the network traffic profile, the network access server is configured to:
  simulate degraded network conditions for the network traffic based on the network traffic profile.

4. The system as recited in claim 1, wherein the network access server is configured to:
  determine an additional network traffic profile for an additional client device seeking network access through the network access server, wherein the additional network traffic profile comprises one or more of an additional network latency configuration, an additional network bandwidth configuration, or an additional network packet loss configuration;
  select an additional individual endpoint server from the plurality of endpoint servers based on a geographical location of the selected additional endpoint server;
  route additional network traffic from the additional client device to an additional external server through the selected additional endpoint server, wherein the additional network traffic sent from the additional client device to the additional external server appears to originate from a network address of the selected additional endpoint server; and
  simulate network conditions for the additional network traffic based on the additional network traffic profile.

5. A computer-implemented method, comprising:
determining a network traffic profile, wherein the network traffic profile comprises one or more settings describing network conditions;
selecting an individual endpoint server from a plurality of endpoint servers based on a location of the selected endpoint server;

routing network traffic through the selected endpoint server, wherein at least a portion of the network traffic appears to originate from a network address of the selected endpoint server; and simulating network conditions for the network traffic based at least on the network traffic profile.

6. The method as recited in claim 5, wherein the network traffic profile is determined for a client device, and wherein the network traffic is routed from the client device to an external server through the selected endpoint server.

7. The method as recited in claim 6, wherein the network traffic profile is specified by the client device.

8. The method as recited in claim 6, wherein the location of the selected endpoint server is specified by the client device.

9. The method as recited in claim 6, wherein the external server implements a geolocation restriction for access to the external server, and wherein routing the network traffic through the selected endpoint server bypasses the geolocation restriction for the client device.

10. The method as recited in claim 5, wherein the network traffic profile comprises one or more of a network latency parameter, a network bandwidth parameter, or a network packet loss parameter.

11. The method as recited in claim 5, wherein the network traffic is routed through the selected endpoint server using a tunnel to the selected endpoint server.

12. The method as recited in claim 5, further comprising simulating degraded network conditions for the network traffic based on the network traffic profile.

13. The method as recited in claim 5, further comprising
determining an additional network traffic profile, wherein the additional network traffic profile comprises one or more additional settings describing network conditions;
selecting an additional individual endpoint server from the plurality of endpoint servers based on a location of the selected additional endpoint server; and
routing additional network traffic through the selected additional endpoint server, wherein at least a portion of the additional network traffic appears to originate from a network address of the selected additional endpoint server, and wherein network conditions for the additional network traffic are simulated based on the additional network traffic profile.

14. A non-transitory, computer-readable storage medium storing program instructions computer-executable to perform:
selecting a network traffic profile for a client device, wherein the network traffic profile specifies parameters for simulating degraded network conditions;
selecting an individual endpoint server from a plurality of endpoint servers based on a location of the selected endpoint server; and
routing network traffic from the client device to an external server through the selected endpoint server, wherein at least a portion of the network traffic appears to originate from a network address of the selected endpoint server, and wherein network conditions for the network traffic are simulated based on the network traffic profile.

15. The non-transitory, computer-readable storage medium as recited in claim 14, wherein the network traffic profile is selected by a network access server that implements network access for the client device.

16. The non-transitory, computer-readable storage medium as recited in claim 14, wherein the external server implements a geolocation restriction for access to the external server, and wherein routing the network traffic through the selected endpoint server bypasses the geolocation restriction for the client device.

17. The non-transitory, computer-readable storage medium as recited in claim 14, wherein the network traffic profile comprises one or more of a network latency parameter, a network bandwidth parameter, or a network packet loss parameter.

18. The non-transitory, computer-readable storage medium as recited in claim 14, wherein the program instructions computer-executable to perform:
selecting an additional network traffic profile for the client device, wherein the additional network traffic profile specifies different parameters for simulating degraded network conditions;
receiving additional network traffic from the client device; and
performing traffic shaping on the additional network traffic based on the additional network traffic profile.

19. The non-transitory, computer-readable storage medium as recited in claim 14, wherein the program instructions computer-executable to perform:
selecting an additional network traffic profile for an additional client device, wherein the additional network traffic profile specifies additional parameters for simulating degraded network conditions;
selecting an additional individual endpoint server from the plurality of endpoint servers based on a location of the selected additional endpoint server; and
routing additional network traffic from the additional client device to an additional external server through the selected additional endpoint server, wherein at least a portion of the additional network traffic appears to originate from a network address of the selected additional endpoint server, and wherein network conditions for the additional network traffic are simulated based on the additional network traffic profile.

20. The non-transitory, computer-readable storage medium as recited in claim 14, wherein the external server comprises an online marketplace, and wherein routing the network traffic from the client device to the external server through the selected endpoint server comprises simulating a customer interaction with the online marketplace from the location of the selected endpoint server.

* * * * *